United States Patent
Hay et al.

(10) Patent No.: US 12,491,667 B2
(45) Date of Patent: Dec. 9, 2025

(54) ROTATIONAL MOLDING COMPOSITION

(71) Applicant: NOVA Chemicals (International) S.A., Fribourg (CH)

(72) Inventors: Henry Hay, Calgary (CA); Carmine D'Agostino, Mississauga (CA)

(73) Assignee: NOVA Chemicals (International) S.A., Fribourg (CH)

( * ) Notice: Subject to any disclaimer, the term of this patent is extended or adjusted under 35 U.S.C. 154(b) by 210 days.

(21) Appl. No.: 18/041,014

(22) PCT Filed: Sep. 3, 2021

(86) PCT No.: PCT/IB2021/058062
§ 371 (c)(1),
(2) Date: Feb. 8, 2023

(87) PCT Pub. No.: WO2022/058835
PCT Pub. Date: Mar. 24, 2022

(65) Prior Publication Data
US 2023/0339150 A1    Oct. 26, 2023

Related U.S. Application Data

(60) Provisional application No. 63/080,874, filed on Sep. 21, 2020.

(51) Int. Cl.
| | | |
|---|---|---|
| C08L 23/06 | (2006.01) |
| B29C 41/00 | (2006.01) |
| B29C 41/04 | (2006.01) |
| B29C 41/22 | (2006.01) |
| B29K 23/00 | (2006.01) |
| B29K 105/00 | (2006.01) |
| B29K 105/26 | (2006.01) |

(52) U.S. Cl.
CPC ............ B29C 41/003 (2013.01); B29C 41/04 (2013.01); B29C 41/22 (2013.01); B29K 2023/0608 (2013.01); B29K 2105/0044 (2013.01); B29K 2105/26 (2013.01); B29K 2995/0012 (2013.01); B29K 2995/0063 (2013.01)

(58) Field of Classification Search
CPC .................. C08L 23/06; C08L 2207/20
See application file for complete search history.

(56) References Cited

U.S. PATENT DOCUMENTS

| | | | | |
|---|---|---|---|---|
| 5,589,128 A | * | 12/1996 | Lai | C08L 23/0815 |
| | | | | 525/240 |
| 5,844,029 A | | 12/1998 | Prabhu et al. | |
| 5,895,790 A | | 4/1999 | Good | |
| 6,180,203 B1 | * | 1/2001 | Unkles | B32B 5/32 |
| | | | | 108/51.11 |
| 6,274,675 B1 | * | 8/2001 | DePorter | C08L 23/04 |
| | | | | 525/194 |
| 2010/0047596 A1 | | 2/2010 | Maziers | |
| 2017/0107364 A1 | * | 4/2017 | Trolez | C08L 23/06 |
| 2019/0322819 A1 | | 10/2019 | Camilo et al. | |
| 2020/0010652 A1 | * | 1/2020 | Brown | B29B 7/244 |
| 2022/0281150 A1 | * | 9/2022 | Carbonell | D01F 8/06 |
| 2023/0045215 A1 | * | 2/2023 | Clavelle | C08L 23/0815 |
| 2024/0084115 A1 | * | 3/2024 | Weber | C08L 23/06 |

FOREIGN PATENT DOCUMENTS

| | | |
|---|---|---|
| KR | 101533559 B1 | 7/2015 |
| WO | WO-93/00400 A1 | 1/1993 |
| WO | WO-2020/169548 A1 | 8/2020 |
| WO | WO-2021/165805 A1 | 8/2021 |

OTHER PUBLICATIONS

ASTM D1238-13—Standard Test Method for Melt Flow Rates of Thermoplastics by Extrusion Plastometer—Copyright ASTM International—Current edition approved Aug. 1, 2013. Published Aug. 2013. Originally approved in 1965. Last previous edition approved in 2010 as D1238-10 (pp. 1-16).
ASTM D1921-18—Standard Test Methods for Particle Size (Sieve Analysis) of Plastic Materials—Copyright ASTM International—Current edition approved Apr. 1, 2018. Published Apr. 2018. Originally approved in 1961. Last previous edition approved in 2012 as D1921-12 (pp. 1-4).
ASTM D792-13—Standard Test Methods for Density and Specific Gravity (Relative Density) of Plastics by Displacement—Copyright ASTM International—Current edition approved Nov. 1, 2013. Published Nov. 2013. Originally approved in 1944. Last previous edition approved in 2008 as D792-08 (pp. 1-6).
International Search Report and Written Opinion of the International Searching Authority issued in PCT Application No. PCT/IB2021/058062, mailed date Jan. 12, 2021.

* cited by examiner

*Primary Examiner* — Margaret G Moore
(74) *Attorney, Agent, or Firm* — Thomas J. Styslinger

(57) ABSTRACT

Compositions for forming rotationally molded (rotomolded) parts, methods for forming the rotomolded parts, and the rotomolded parts are provided. An exemplary rotomolding composition includes a virgin resin, including a polyethylene polymer, and a postconsumer recycle (PCR) resin.

13 Claims, 10 Drawing Sheets

ROTATIONAL MOLDING COMPOSITION

CROSS-REFERENCE TO RELATED APPLICATIONS

This application is a U.S. National Phase Application under 35 U.S.C. § 371 of International Application No. PCT/IB2021/058062, filed on Sep. 3, 2021, which in turn claims priority to and the benefit of U.S. Provisional Patent Application No. 63/080,874, filed Sep. 21, 2020, both of which are incorporated herein by reference in their entirety.

TECHNICAL FIELD

Embodiments are directed at the use of recycled polymeric materials in rotational molding (rotomolding) compositions. More specifically, rotomolding parts partially formed from blends including post-consumer recycle (PCR) resin are disclosed.

BACKGROUND ART

The amount of plastic waste has increased the interest in reuse, such as through chemical or physical recycling. Physical recycling, or the reprocessing of plastic waste to form new products, provides one route for reuse of plastic wastes. Recycled polymeric materials are available in a variety of forms ranging from waste materials produced and collected at the point of manufacture to commercially available post-consumer recycled streams.

However, the reprocessing of recycled polymer streams can be problematic due to molecular degradation, oxidation, and other chemical changes. Further, the composition of available streams of recycled polymers can vary because the goods being recycled include mixtures of different polymers, including polar and non-polar materials, such as polyethylene (PE), polypropylene homopolymer (hPP), PP impact copolymers (ICP-PP), polypropylene random copolymer (rPP), polyethylene terephthalate (PET), ethylene vinyl alcohol (EVOH), polyamide (PA), and grafted polyolefins (gPO), among others. Accordingly, the incorporation of recycled plastic into second and third use products remains a challenge technically, commercially, and financially.

SUMMARY OF INVENTION

In an embodiment described in examples herein, a rotomolding composition is provided. The rotomolding composition includes a virgin resin, including a polyethylene polymer and a postconsumer recycle (PCR) resin.

Another embodiment described in examples herein provides a method to prepare a rotomolded part. The method includes preparing a rotomolding composition. The rotomolding composition includes a virgin resin, including a polyethylene polymer and a postconsumer recycle (PCR) resin. The rotomolding composition is added to a mold and the mold is rotated to evenly distribute the rotomolding composition on an interior surface of the mold while heating the mold to form the rotomolded part. The mold is rotated while being cooled to solidify the rotomolded part. The rotomolded part is removed from the mold.

Another embodiment described in examples herein provides a rotomolded part. The rotomolded part has an exterior layer formed from virgin resin and an interior layer formed from postconsumer recycle (PCR) resin.

DESCRIPTION OF EMBODIMENTS

Disclosed herein are methods, apparatus and compositions for the incorporation of recycled resin into rotationally molded products. In some embodiments, the techniques can be used to form structures that have an outer surface formed from a newly manufactured or "virgin" resin (A) and an inner surface formed from the recycled resin (B), termed an "AB" structure herein. In can be noted that the coverage of the surfaces does not have to form a complete layer. In some embodiments, the inner surface is only partially covered by the recycled resin (B). In other embodiments, the techniques can be used to form structures that have an ABA layer structure, or a BA layer structure, among others.

Generally, the AB layer structure is formed by the physics of the formation of the part, wherein the finer and more easily melted material of the virgin polymer settles to the interior surface of a mold, while the larger particles of the recycled polymer "float" on the finer material of the virgin polymer, and are carried towards the inside surface of the part. Other structures, such as ABA layer structures or BA layer structures use other techniques to deposit different polymers in the mold. For example, a dropbox may be used to deposit a second or third material inside the part after the first layers have melted and adhered to the sides. Alternatively, after the part has cooled, the mold they be reopened and additional resins added to the interior of the part. The part may be then reheated to melt the additional resins into an interior layer. As described herein, the addition of a third layer to the AB structure may be used to increase impact strength, or other properties. The third layer may be the same as the first layer.

FIGS. 1A-1D are schematic drawings of the formation of a rotationally molded part that includes a recycled polymer. Rotational molding (herein termed "rotomolding") is a process used to produce hollow plastic parts. It allows for the formation of products that would be difficult or less economical to make by other processes, such as plastic barrels, tanks, gasoline containers, garbage cans, agricultural storage vessels, septic tanks, and sporting goods, such as kayaks, among many others.

Figure 1A:
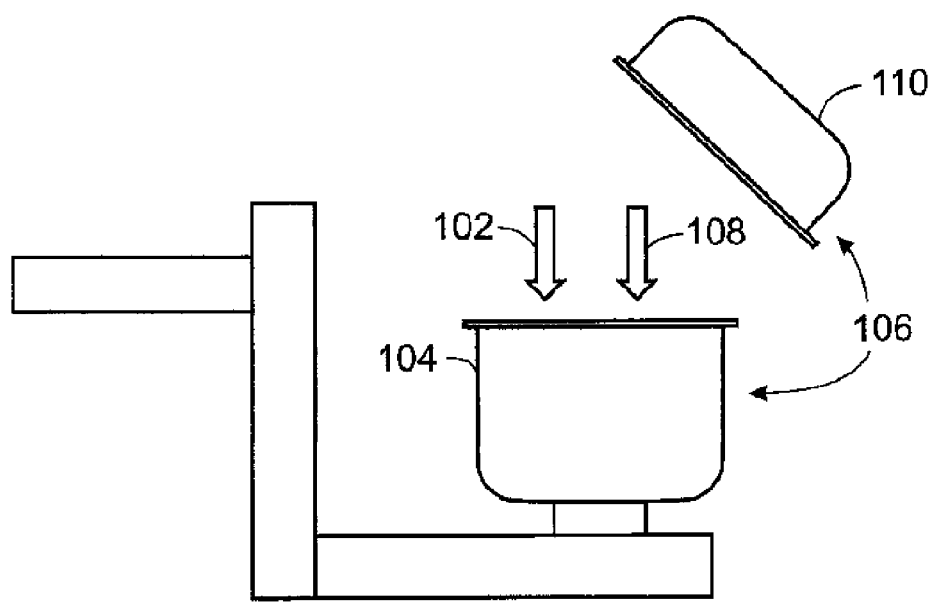
FIGS. 1A-1D are schematic drawings of the formation of a rotationally molded part that includes recycled resin.

As shown in FIG. 1A, a charge of a virgin resin 102 that is finally divided into particles is loaded into the body 104 of a mold 106. As described herein, a virgin resin 102 is a newly manufactured polymeric material. In some embodiments, a charge of recycled resin 108 is also added to the body 104 of the mold 106, for example, if the recycled resin 108 is not already blended with the virgin resin 102. In some embodiments, the recycled resin 108 is post-consumer recycle (PCR) resin recovered from recycling operations, such as reprocessed plastic bottles, bags, or other consumer materials. In some embodiments, the recycled resin 108 is a post-industrial recycle (PIR) resin reprocessed from plastic parts recovered from industrial users, such as plastic barrels, pallets, and the like. The mold 106 is then closed by attaching a lid 110 to the body 104.

Figure 1B:
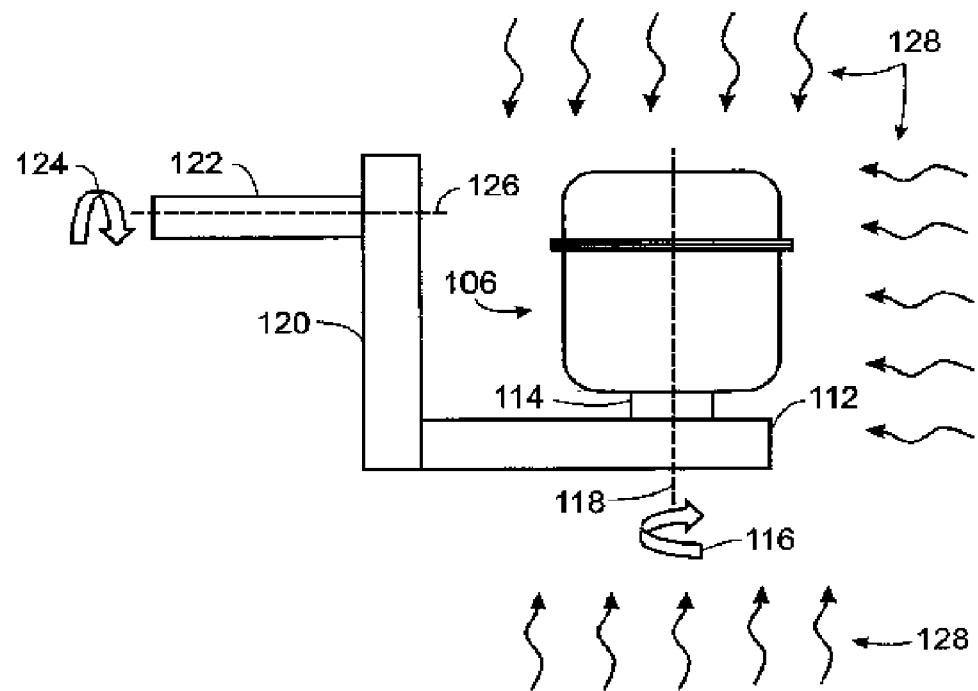

As shown in FIG. 1B, the mold 106 is mounted to a support bar 112 by a motor or gear assembly 114 that rotates 116 the mold 106 along a first axis 118. The support bar 112 is attached to a side assembly 120 which is attached to a shaft 122. The shaft 122 is attached to another motor or gear assembly (not shown) that rotates 124 the shaft 122, including the side assembly 120, support bar 112, and mold 106 around a second axis 126.

During the rotomolding process, the mold 106 is generally rotated around both of the axes 118 and 126, while heat 128 is applied to raise the mold 106 to a temperature above the melting point of the plastic resins 102 and 108. Heating of the mold 106 is generally performed by inserting the rotating mold 106 into a large oven cavity (not shown). The plastic resins 102 and 108 fall through the cavity of the mold 106 under the forces caused by the rotation of the apparatus, sticking to the interior surface of the mold 106 and melting to form a layer or layers along the interior surface of the mold 106. The rotation continues for sufficient time to allow the plastic resins 102 and 108 to cover the interior surface of the mold 106.

Figure 1C:
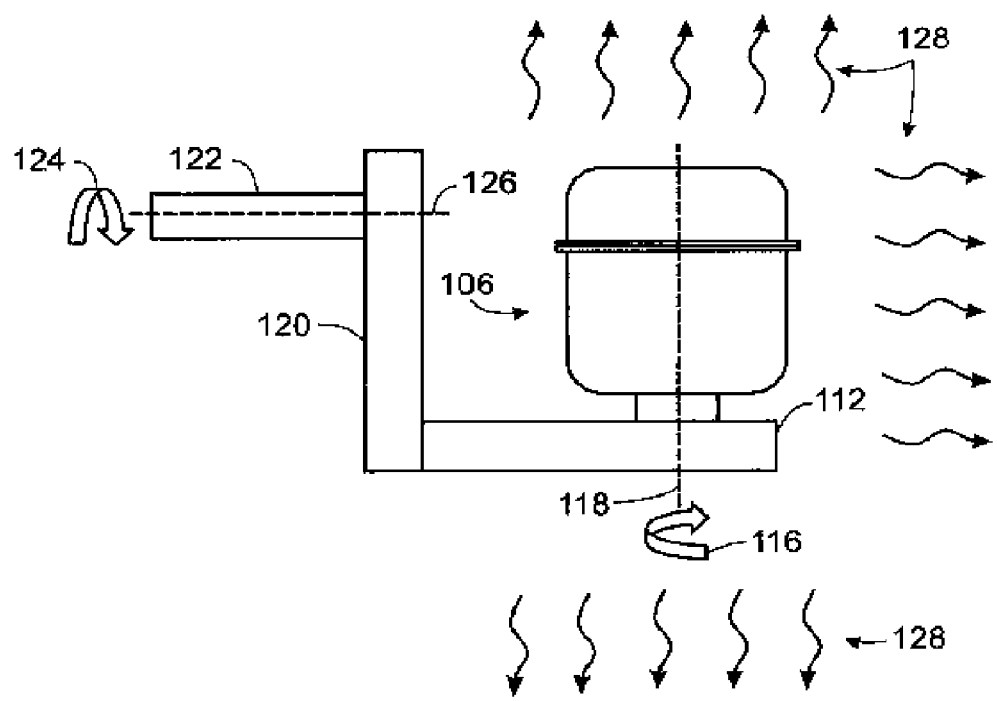

As shown in FIG. 1C, the mold 106 is then cooled to remove heat 128, permitting the plastic resins 102 and 108 to freeze into a solid. The cooling may be performed by removing the mold 106 from an oven cavity and allowing it to cool. Active cooling, for example, using a water spray may be performed to more quickly cool the mold 106. Generally, during cooling, the mold 106 continues to rotate 116 and 124 to prevent the plastic resins 102 and 108 from settling while they are still soft.

Figure 1D:
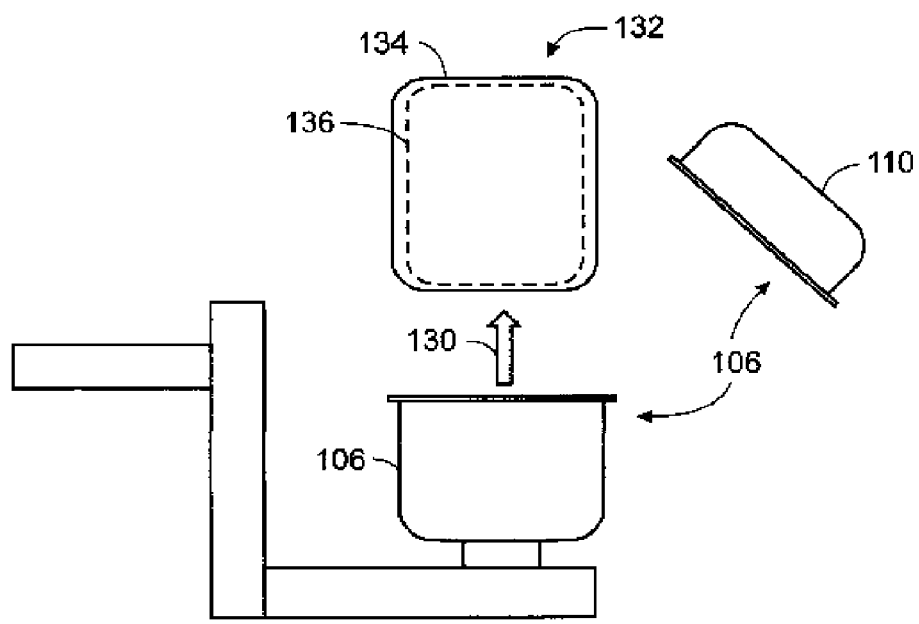

As shown in FIG. 1D, the final stage of the molding cycle is the removal 130 of the part 132 from the mold 106 of the rotomolding machine. The removal 130 is performed by removing the lid 110 from the mold 106, followed by removing the part 132.

The time required to complete the molding cycle is a function of the bulk properties of the plastic resins 102 and 108 which are being molded, the size of the part 132 being molded, and the molding temperature. Further, as described herein, the virgin resin 102 that is charged into the mold is finely divided, for example, ground into powder or produced as small spherical particles. Generally, the virgin resin 102 has a high bulk density and a narrow particle size distribution to facilitate the "free flow" of the resin. The recycled resin 108 generally has a larger particle size than the virgin resin 102, as described herein.

The physical properties of the rotomolded part are influenced by the use of a proper molding cycle time. Parts processed for too short a time or at too low of a temperature are termed "undercooked" parts, and may have poor strength. Parts processed at too high of a temperature or for too long of a time are termed "overcooked" parts and may have a poor appearance, such as a burnt color, a deterioration of strength properties, or both. Further, a short molding cycle may improve the productivity of the expensive rotomolding machinery. A broad processing window is also desirable, for example, a rotomolding composition that provides properly cooked parts in a short period of time, but does not become overcooked if processed for an extended period of time.

Generally, the processing window of the virgin resin 102 will be broader than the processing window of the recycled resin 108, as the recycled resin 108 has already passed through a number of processing operations. Each of the processing operations decreases the amount of stabilizers in the recycled resin 108 and increases the amount of molecular damage to the polymer backbones of the recycled resin 108.

The properties of the rotomolded part 132 are affected by the molecular structure of the resins 102 and 108 used to prepare the part. Physical properties of importance include appearance, stiffness (as indicated by the modulus of the part), environmental stress crack resistance (or ESCR), impact resistance, and resistance to warpage, among others.

Accordingly, the molding time and temperature of the process are affected by many variables. Specific or preferred conditions can also be impacted by the choice of machine. However, those skilled in the art will be able to optimize conditions without undue difficulty. Suitable conditions for rotomolding the present composition are illustrated in the examples.

As described herein, the addition of the virgin resin 102 and the recycled resin 108 to the mold 106 results in the part 132 having an external surface 134 formed from the virgin resin 102 and an interior surface 136 formed from the recycled resin 108. As a result, the visible external surface 134 is likely to be smoother and more attractive to a consumer, while the hidden interior surface 136 may be rougher, off-color, and the like.

Definition of Terms

Other than in the examples or where otherwise indicated, all numbers or expressions referring to quantities of ingredients, extrusion conditions, etc., used in the specification and claims are to be understood as modified in all instances by the term "about". Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, the amounts of the components actually used will conform to the maximum of 100 percent.

In order to form a more complete understanding of this disclosure the following terms are defined and should be used with the accompanying figures and the description of the various embodiments throughout.

As used herein, the term "monomer" refers to a small molecule that may chemically react and become chemically bonded with itself or other monomers to form a polymer.

As used herein, the term "layer" refers to a zone of plastic resin in a structure that is mostly composed of a single resin. Layers can be interpenetrating, as described herein. Further, a layer does not have to completely cover another layer but may partially cover the other layer.

As used herein, the term "α-olefin" is used to describe a monomer having a linear hydrocarbon chain containing from 3 to 20 carbon atoms having a double bond at one end of the chain; examples include butene-1; hexene-1 and octene-1.

Polyethylene

Polyethylene is a commonly used plastic resin for the manufacture of rotomolded parts. Polyethylene copolymer, which is generally prepared by the copolymerization of ethylene with a $C_{4-10}$ alpha olefin in the presence of a catalyst, is typically used, although polyethylene homopolymer may also be used. The alpha olefin comonomer produces short chain branches (SCB) in the copolymer. The SCBs reduce the crystallinity of the copolymer in comparison to a linear ethylene homopolymer. As a result, the polyethylene copolymers typically have improved impact resistance in comparison to polyethylene homopolymers.

The polyethylene copolymers may be referred to as heterogeneous in the sense that the polyethylene copolymer is actually a mixture of different polyethylene chains having significantly different molecular weights and comonomer distributions. Most notably, a heterogeneous polyethylene generally contains three fractions, a low molecular weight fraction having a high comonomer content (or high level of SCB), which is often referred to as "wax" or "extractables". A second fraction includes a very high molecular weight fraction having little or no comonomer, and thus this fraction is often referred to as "homopolymer". A third fraction includes polymer chains of intermediate molecular weight and SCB content.

The heterogeneous polyethylenes are well suited for rotomolding. For example, while not wishing to be bound by theory, it has been postulated that the high molecular weight homopolymer fraction may enhance the stiffness or modulus of the rotomolded parts.

More recently, homogeneous polyethylenes have become commercially available. The homogenous polyethylenes have a uniform, or narrow, molecular weight distribution and a uniform comonomer distribution. This, in turn, causes the homogeneous polyethylenes to have a well-defined, or sharp, melting point in comparison to the heterogeneous polyethylenes which have a melting point range or even multiple melting points. It is also known to use homogeneous polyethylene in a rotomolding process.

As used herein "virgin resin," "virgin polymer," or "virgin polyethylene," or "vPE" refers to polymers, such as polyethylene polymers, made and used directly from a traditional lab scale, pilot scale, demonstration scales, or commercial scale apparatus. Virgin resins generally have not been through multiple processing cycles and thus will retain most of their initial properties and stabilizers.

As used herein "recycled resin," "recycled polymer," "recycled polymeric material," or "PCR resin" refers to plastic materials that have been recovered or otherwise diverted from the solid waste stream. Recycled polymers diverted either during the manufacturing process or after the manufacturing process but before consumer use is sometimes referred to as post-industrial resin, post-industrial recycle, or PIR. Recycled materials recovered after consumer use is sometimes referred to as post-consumer recycled resin, or PCR resin. The term "recycled resin" refers to both PIR and PCR. Either material, or blends of both, are suitable for use as disclosed herein.

Both PCR and PIR materials can be purchased commercially. In some embodiments, ECOPRIME® resin from Envision Plastics of Atlanta, Georgia, U.S.A. are used. In some embodiments, commercially available recycled resins from KW Plastics recycling division of Troy, Alabama U.S.A. are used, such as the product grades KWR105M2, or KWR105BLK, among others.

Commercially available PIR and PCR resin can vary in composition, as they are often a mixture of polar and non-polar materials, including polyethylene (PE), polypropylene homopolymer, polypropylene impact copolymers, polypropylene random copolymer, polyethylene terephthalate, ethylene vinyl alcohol, polyamide, or grafted polyolefins, among many others. In some embodiments, the recycled polymeric material is derived from polyethylene products so that the PCR resin is primarily polyethylene, such as greater than about 85%, greater than about 90%, or greater than about 95%.

The polyethylene PCR resin may have known contaminants such as inks, antioxidants, metals, or other additives found in consumer plastic goods. In some embodiments, the recycled polymeric material is primarily a mixture of polyolefins, such as greater than about 85%, greater than about 90%, or greater than about 95%. The polyolefin PCR may have known contaminants such as inks, antioxidants, metals, or other additives found in consumer plastic goods. In some embodiments, the recycled polymeric material is a mixture of polyolefins with polymers containing polar groups. These blends of materials may cause problems in traditional melt blending of materials, due to incompatibility between the varying kinds of polymeric materials in PCR resins and the virgin resins with which they may be blended or compounded, often resulting in a final product with poor mechanical and optical properties.

As used herein "recycled polyolefins" or "recycled non-polar polymer" refers to recycled polymeric materials of any source where the mixture includes two or more non-polar polymers, for example combinations of polyolefins, or for example, a combination of polyethylene and polypropylene. The materials may contain impurities such as inks, antioxidants, metals, or other additives found in consumer plastic goods.

As used herein "recycled polyethylene" or "rPE" refers to polyethylene that has been recovered or otherwise diverted from the solid waste stream. In some embodiments rPE can be simulated by exposing virgin polyethylene exposed to at least one, and, in some embodiments several, heat histories to simulate processing operations. It will be appreciated by those skilled in the art that polyethylene is typically converted into finished goods in processes that involve melting the polyethylene and then forming it into the finished good. The melting process is referred to as a "heat history."

Stabilized Polyethylene

The term "stabilized polyethylene" broadly refers to a polyethylene (which may be a heterogeneous polyethylene or a homogeneous polyethylene) that contains a "stabilizer" package to protect the polyethylene against degradation and oxidation during the rotomolding process. In general, any stabilizer package that is currently used in a rotomolding application is potentially suitable for use in the present process. Skilled persons will recognize that many such stabilizer packages are in current use. Virgin resin used in rotomolding is generally a stabilized polyethylene.

In various embodiments, the stabilizer package includes a primary antioxidant (which, while not wishing to be bound by theory, is commonly believed to scavenge free radicals), and a secondary antioxidant (which, while not wishing to be bound by theory, is commonly believed to quench hydroperoxides). Suitable, non-limiting examples of primary antioxidants include hindered phenols, hydroxylamines and lactones, and suitable amounts are from about 100 to about 2000, or from about 250 to about 1500 parts per million by weight ("ppm") based on the weight of the polyethylene.

Suitable, non-limiting secondary antioxidants include phosphites and phosphinites, particularly in amounts of from about 100 to about 2000, or from about 250 to about 1500 ppm.

It is also often desirable to include a light stabilizer to protect from ultraviolet light exposure, such as in outdoor applications. In some embodiments, a hindered amine light stabilizer (HALS) is used in the rotomolding compositions, for example, in amounts of from about 500 to about 3000 ppm. In some embodiments, zinc oxide is added to the rotomolding compositions in an amount of from about 500 to about 5000 parts per million by weight. In some embodiments, an ultraviolet (UV) absorber is added to further improve the stability of a rotomolded part that is exposed to sunlight.

In an embodiment, the stabilizer package includes from about 250 to about 1500 ppm of at least one primary antioxidant chosen from hindered phenols and hydroxylamines. The stabilizer package also includes from about 100 to about 1000 ppm of at least one secondary antioxidant chosen from phosphites and phosphinites. The stabilizer package also includes from about 500 to about 3000 ppm of HALS, and from about zero to about 5000 ppm of zinc oxide.

Many other additives are also known to be used with polyethylene. Some of these additives are described in the Additives section below.

The additives may be incorporated into the polyethylene compositions using mixing equipment such as an extruder or an internal batch mixer, such as a Banbury mixer. An additive may be added "neat", for example, directly to the resin as the source compound. An additive may be added as a "masterbatch", for example, by premixing the additives with a small amount of polyethylene which is subsequently mixed with the bulk of the composition. A number of additives may be added as "preblends", for example, as mixtures of the additives.

The stabilized high density polyethylene composition is, in some, embodiments, ground to powder before being used in the rotomolding process. This is often performed in rotomolding and may be used as part of the selection process for the resin properties, for example, in selecting different sizes for different performance in blends with recycled resin. Suitable, non-limiting average particle sizes for the powder are from about 100 to about 1000 μm (micrometers, microns) or about 200 to about 400 μm. In an embodiment, the average particle size of the virgin resin is smaller than the average particle size of the PCR resin.

Additives

In an embodiment, the rotomolding composition may contain at least one primary antioxidant chosen from a hindered phenol (non-limiting examples of which are described herein), and a hydroxylamine (non-limiting examples of which are described herein). The rotomolding composition may contain at least one secondary antioxidant chosen from phosphites and phosphonites (non-limiting examples of which are described herein). In an embodiment, the rotomolding composition includes at least one hindered amine light stabilizer (non-limiting examples of which are described herein).

Many other additives may also be included in polyethylene compositions used in a rotomolding process. Some of these additives are briefly described below.

1. Antioxidants (also Referred to as "Hindered Phenols")

1.1 Alkylated Mono-Phenols

For example, 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4isobutylphenol; 2,6-dicyclopentyl-4-methylphenol; 2-(.alpha.-methylcyclohexyl)-4,6 dimethylphenol; 2,6-di-octadecyl-4-methylphenol; 2,4,6,-tricyclohexyphenol; 2,6-di-tert-butyl-4-methoxymethylphenol; and Vitamin E.

1.2 Alkylated Hydroquinones

For example, 2,6-di-tert-butyl-4-methoxyphenol; 2,5-di-tert-butylhydroquinone; 2,5-di-tert-amyl-hydroquinone; and 2,6-diphenyl-4-octadecyloxyphenol.

1.3 Hydroxylated Thiodiphenyl Ethers

For example, 2,2'-thio-bis-(6-tert-butyl-4-methylphenol); 2,2'-thio-bis-(4-octylphenol); 4,4'thio-bis-(6-tertbutyl-3-methylphenol); and 4,4'-thio-bis-(6-tert-butyl-2-methylphenol).

1.4 Alkylidene-Bisphenols (also Referred to as "Hindered Phenols")

For example, 2,2'-methylene-bis-(6-tert-butyl-4-methylphenol); 2,2'-methylene-bis-(6-tert-butyl-4-ethylphenol); 2,2'-methylene-bis-(4-methyl-6-(alpha-methylcyclohexyl) phenol); 2,2'-methylene-bis-(4-methyl-6-cyclohexyiphenol); 2,2'-methylene-bis-(6-nonyl-4-methylphenol); 2,2'-methylene-bis-(6-nonyl-4methylphenol); 2,2'-methylene-bis-(6-(alpha-methylbenzyl)-4-nonylphenol); 2,2'-methylene-bis-(6-(alpha, alpha-dimethylbenzyl)-4-nonylphenol); 2,2'-methylene-bis-(4,6-di-tert-butylphenol); 2,2'-ethylidene-bis-(6-tert-butyl-4-isobutylphenol); 4,4'methylene-bis-(2,6-di-tert-butylphenol); 4,4'-methylene-bis-(6-tert-butyl-2-methylphenol); 1,1-bis-(5-tert-butyl-4-hydroxy-2-methylphenol)butane 2,6-di-(3-tert-butyl-5-methyl-2-hydroxybenzyl)-4-methylphenol; 1,1,3-tris-(5-tert-butyl-4-hydroxy-2-methylphenyl)butane; 1,1-bis-(5-tert-butyl-4-hydroxy2-methylphenyl)-3-dodecyl-mercaptobutane; ethyleneglycol-bis-(3,3,-bis-(3'-tert-butyl-4'-hydroxyphenyl)-butyrate)-di-(3-tert-butyl-4-hydroxy-5-methylpenyl)-dicyclopentadiene; di-(2-(3'-tert-butyl-2'hydroxy-5'methylbenzyl)-6-tert-butyl-4-methylphenyl) terephthalate; and other phenolics such as monoacrylate esters of bisphenols such as ethylidiene bis-2,4-di-t-butylphenol monoacrylate ester.

2. UV Absorbers and Light Stabilizers

2.1 2-(2'-Hydroxyphenyl)-Benzotriazoles

For example, the 5'-methyl-,3'5'-di-tert-butyl-,5'-tert-butyl-,5'(1,1,3,3-tetramethylbutyl)-,5-chloro-3',5'-di-tert-butyl-,5-chloro-3'-tert-butyl-5'-methyl-3'-sec-butyl-5'-tert-butyl-,4'-octoxy,3',5'-ditert-amyl-3',5'-bis-(alpha, alpha-dimethylbenzyl)-derivatives.

2.2 2-Hydroxy-Benzophenones

For example, the 4-hydroxy-4-methoxy-,4-octoxy,4-decyloxy-, 4-dodecyloxy-,4-benzyloxy,4,2',4'-trihydroxy- and 2'-hydroxy-4,4'-dimethoxy derivative.

2.3 Hindered Amine Light Stabilizers (HALS)

For example, bis (2,2,6,6-tetramethylpiperidyl)-sebacate; bis-5(1,2,2,6,6-pentamethylpiperidyl)-sebacate; n-butyl-3, 5-di-tert-butyl-4-hydroxybenzyl malonic acid bis(1,2,2,6,6,-pentamethylpiperidyl)ester; condensation product of 1-hydroxyethyl-2,2,6,6-tetramethyl-4-hydroxy-piperidine and succinic acid; condensation product of N,N'-(2,2,6,6-tetramethylpiperidyl)-hexamethylenediamine and 4-tert-octylamino-2,6-dichloro-1,3,5-s-triazine; tris-(2,2,6,6-tetramethylpiperidyl)-nitrilotriacetate, tetrakis-(2,2,6,6-tetramethyl-4-piperidyl)-1,2,3,4butane-tetra-arbonic acid; and 1,1'(1,2-ethanediyl)-bis-(3,3,5,5-tetramethylpiperazinone). These amines typically called HALS (Hindered Amines Light Stabilizing) include butane tetracarboxylic acid 2,2,6,6-tetramethyl piperidinol esters. Such amines include hydroxylamines derived from hindered amines, such as di(1-hydroxy-2,2,6,6-tetramethylpiperidin-4-yl) sebacate; 1-hydroxy 2,2,6,6-tetramethyl-4-benzoxypiperidine; 1-hydroxy-2,2,6,6-tetramethyl-4-(3,5-di-tert-butyl-4-hydroxy hydrocinnamoyloxy)-piperdine; and N-(1-hydroxy-2,2,6,6-tetramethyl-piperidin-4-yl)-epsiloncaprolactam.

3. Phosphites and Phosphonites

For example, triphenyl phosphite; diphenylalkyl phosphates; phenyldialkyl phosphates; tris(nonyl-phenyl)phosphite; trilauryl phosphite; trioctadecyl phosphite; distearyl pentaerythritol diphosphite; tris(2,4-di-tert-butylphenyl) phosphite; diisodecyl pentaerythritol diphosphite; 2,4,6-tri-tert-butylphenyl-2-butyl-2-ethyl-1,3-propanediol phosphite; bis(2,4-di-tert-butylphenyl)pentaerythritol diphosphite tristearyl sorbitol triphosphite; and tetrakis(2,4-di-tert-butylphenyl)4,4'-biphenylene diphosphonite.

4. Peroxide Scavengers

For example, esters of betathiodipropionic acid, for example the lauryl, stearyl, myristyl or tridecyl esters; mercaptobenzimidazole or the zinc salt of 2-mercaptobenzimidazole; zinc-dibutyldithiocarbamate; dioctadecyldisulfide; and pentaerythritottetrakis-(beta-dodecylmercapto)-propionate.

5. Hydroxylamines and Amine Oxides

For example, N,N-dibenzylhydroxylamine; N,N-diethylhydroxylamine; N,N-dioctylhydroxylamine; N,N-dilaurylhydroxylamine; N,N-ditetradecylhydroxylamine; N,N-dihexadecylhydroxylamine; N,N-dioctadecylhydroxylamine; N-hexadecyl-N-octadecylhydroxylamnine; N-heptadecyl-N-octadecylhydroxylamine; and N,N-dialkylhydroxylamine derived from hydrogenated tallow amine. The analogous amine oxides (as disclosed in U.S. Pat. No. 5,844,029, Prachu et al.) are also suitable.

6. Nitrones

For example, N-benzyl-alpha-phenyl nitrone; N-ethyl-alpha-methyl nitrone; N-octyl-alpha-heptyl nitrone; N-lauryl-alpha-undecyl nitrone; N-tetradecyl-alpha-tridecyl nitrone; N-hexadecyl-alpha-pentadecyl nitrone; N-octadecyl-alpha-heptadecylnitrone; N-hexadecyl-alpha-heptadecyl nitrone; N-octadecyl-alpha-pentadecyl nitrone; N-heptadecyl-alpha-heptadecyl nitrone; N-octadecyl-alpha-hexadecyl nitrone; and nitrone derived from N,N-dialkylhydroxylamine derived from hydrogenated tallow amine.

7. Basic Co-Stabilizers

For example, melamine; polyvinylpyrrolidone; dicyandiamide; triallyl cyanurate; urea derivatives; hydrazine derivatives; amines; polyamides; polyurethanes; alkali metal salts and alkaline earth metal salts of higher fatty acids, for example, Ca stearate, calcium stearoyl lactate, calcium lactate, Zn stearate, Mg stearate, Na ricinoleate and K palmitate; antimony pyrocatecholate or zinc pyrocatecholate, including neutralizers such as hydrotalcites and synthetic hydrotalcites; and Li, Na, Mg, Ca, Al hydroxy carbonates.

8. Nucleating Agents

For example, 4-tert-butylbenzoic acid; adipic acid; diphenylacetic acid; sodium salt of methylene bis-2,4-dibutylphenyl; cyclic phosphate esters; sorbitol tris-benzaldehyde acetal; and sodium salt of bis(2,4-di-t-butylphenyl) phosphate or Na salt of ethylidene bis(2,4-di-t-butyl phenyl) phosphate. Nucleating agents may improve stiffness of the rotomolded part.

9. Fillers and Reinforcing Agents

For example, calcium carbonate; silicates; glass fibers; asbestos; talc; kaolin; mica; barium sulfate; metal oxides and hydroxides; carbon black and graphite.

10. Miscellaneous

For example, plasticizers; epoxidized vegetable oils, such as epoxidized soybean oils; lubricants; emulsifiers; pigments; optical brighteners; flameproofing agents; anti-static agents; blowing agents; and thiosynergists, such as dilaurythiodipropionate or distearylthiodipropionate.

Figure 2:
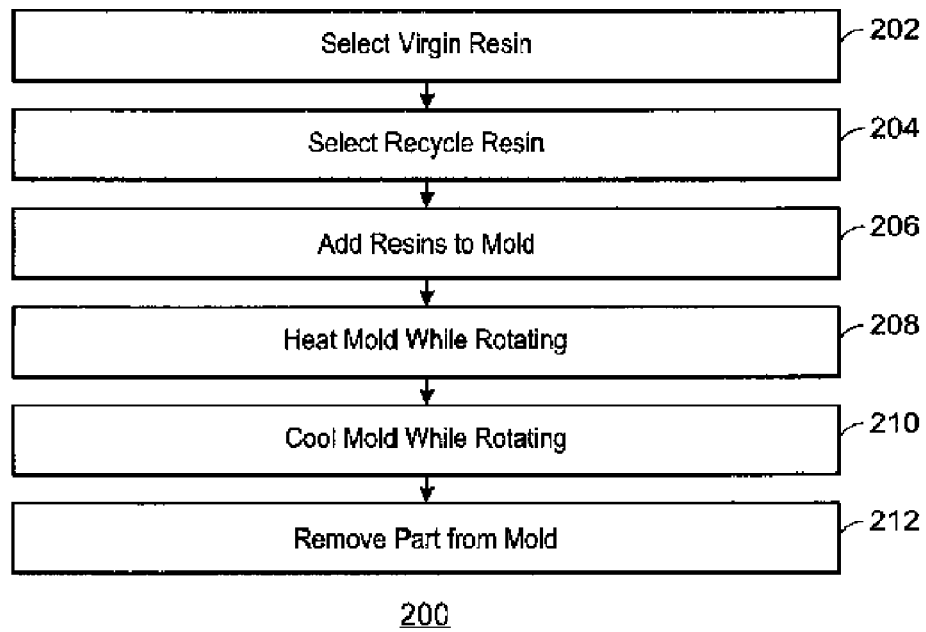
FIG. 2 is a process flow diagram of a method for incorporating recycled resin into a rotationally molded part.

FIG. 2 is a process flow diagram of a method 200 for incorporating recycled resin into a rotationally molded part. The method begins at block 202 with the selection of the virgin material. As described herein, the virgin resin may include any number of polymers, such as polyethylene copolymers, polyethylene homopolymers, and the like. These materials may be formed using Ziegler-Natta polymerization, single site or metallocene polymerization, or any number of other processes. Further, the stabilizer package matching the application of the final part may be selected, as described herein. Depending on the application of the rotomolded part, other polymeric materials may be selected, such as nylons, polycarbonates, polyurethanes, and the like.

The size of the virgin resin is part of the selection process and may be determined to control the layering process with the recycled resin.

At block 204, the recycled resin is selected. Generally, the recycled resin is chosen to be as compatible as practical with the virgin resin. For example, recycled resins are often available as "polyethylenes", "polypropylenes", or other resin types. However, as noted herein, the recycled resins will often have small amounts of other materials as contaminants. As described herein, the particle size of the recycled resin is also a parameter that may be controlled to modify the properties of the final part.

The proportion of the virgin resin to the recycled resin is also selected. In some embodiments, the proportion of the virgin resin to the recycled resin is about 90/10, or about 80/20, or about 70/30, or about 60/40, or about 50/50. As the proportion of the virgin resin is decreased, the properties of the final part are more dependent on the properties of the recycled resin. The effects of different proportions of recycled resin are described further with respect to the examples.

At block 206, the resins are added to the mold in the proportions selected. In some embodiments, the virgin resin and the recycled resin are added to the mold separately. In some embodiments, the virgin resin and the recycled resin are blended prior to being added to the mold.

At block 208, the mold is sealed and the rotation is started. The mold is then heated while rotating to distribute the resin along the interior surface. If more complex layer structures than AB, such as ABA or BA, are desired than another resin may be added after the initial layers are formed, as described herein.

At block 210, the mold is cool while rotation continues. This prevents settling of the softened resin to a lower surface before the part solidifies. As described herein, the cooling may be passive or active. In some embodiments, a water spray is used to cool the mold to solidify the part. In some embodiments, fans are used to cool the mold to solidify the part.

At block 212, the solidified part is removed from the mold. After the part is removed from the mold, other processing may be performed, such as the attachment of inlets to tanks, the bolting of parts together, and the like.

Interior Surface of Molded Part

As shown in the examples herein, the rotomolded parts that are prepared by this process generally have an exterior surface which is predominantly made from the virgin resin. The recycled resin tends to be located away from the exterior surface, for example, located at the interior surface as described herein. As a result, in some embodiments, the interior surface of the part has a higher surface roughness than the exterior surface. Surface roughness may be measured with a mechanical or optical profilometer. In the examples described below, roughness of the interior surface of parts made by the present process was measured using a laser confocal microscope (a type of optical profilometer). The interior surface often had a mean surface roughness, "Ra", of greater than 5 μm. In comparison, the exterior surface has been observed to have a much lower surface roughness, for example, an Ra of from 2 to 4 micrometers.

Recycled Polyethylene Component

The recycled materials, or PCR, useful in this disclosure may be purchased commercially. A number of suppliers, as described herein, provide various grades of recycled resins. Also contemplated for use are any recycled materials with properties that allow for blending with polyethylenes in rotomolding processes.

The compositions provided herein include from 1-50% PCR or in some examples, from 5 to 40 percent, or in other examples from 10 to 30 percent. Because the only limitation is preparation of rotomolded part with the required properties, the amount of PCR resin that can be blended with the virgin resin may be greater than 30% in some instances.

The PCR resin and virgin resin are introduced into the rotomolding processes as resins or pellets. As described herein, the resins or pellets may be physically mixed when they are placed into the rotomolding mold.

The PCR resins are susceptible to oxidation during the rotomolding process, due to the number of processing operations they have endured. PCR resins with less antioxidants and stabilizing agents in the commercially available product are expected to more susceptible to oxidation than those products containing more of these types of additives.

EXAMPLES

The materials used in the Examples are shown in Table 1.

PE-1 and PE-2 are each an example of a "stabilized polyethylene" that are suitable for use in the present compositions and process. PE-1 and PE-2 are also suitable for use in a conventional rotomolding process. The polyethylene resins were RMs539-UG (PE-1) and TR-0735-UIG (PE-2) grades from NOVA Chemicals and used without further preparation. The PCR resin (PCR-1) was KW105M2 grade obtained from KW Plastics recycling division. The entries in Table 1 for PCR-1-S1 and PCR-1-S2 are merely to indicate different particle sizes of the PCR-1 resin.

Average particle size is measured by ASTM D1921.

The polyethylene and Post Consumer Recycle (PCR) used in the Examples are illustrated in Table 1.

TABLE 1

Material Descriptions

| Polyethylene | $I_2$ g/10 minutes | Density g/cm³ | DSC Melting Point (° C.) | Average Particle Size (mm) | Comonomer |
|---|---|---|---|---|---|
| PE-1 | 5.2 | 0.939 | 125 | 0.26 | Octene |
| PE-2 | 7.0 | 0.935 | 126 | 0.25 | Hexene |
| PCR-1 | 4 | 0.947 | 120-150 | 3.52 | Hexene and Butene; trace levels of polypropylene |
| PCR-1-S1 | | | | 1.50 | |
| PCR-1-S2 | | | | 2.03 | |

Post-Consumer Recycle (PCR) Resin

As described herein, no further stabilizers are added to the PCR-1 material. The PCR materials are susceptible to oxidation during the rotomolding process. Accordingly, the level of oxidation in the final molded parts is controlled, at least in part, by the molding conditions of time and temperature.

Virgin Resins

Both PE-1 and PE-2 are suitable for use in conventional rotomolding processes and are suitable as the virgin resin of the present technology. PE-1 is prepared with a single site catalyst and PE-2 is prepared with a conventional Zeigler Natta catalyst.

The stabilizer additives that were added to the PE-1 used in the examples are reported below, expressed as parts per million by weight, based on the weight of the polyethylene ("ppm"). Tradenames of the stabilizers are provided for convenience, together with a description of the chemical name or Chemical Abstracts Registry Number. PE-1 includes: 250 ppm of IRGASTAB® FS042 (n,n,-di(alkyl) hydroxylamine); 250 ppm of IRGASTAB® FS042 (n,n,-di (alkyl) hydroxylamine); 450 ppm of DOVERPHOS® 9228 (a diphosphite: CAS Registry number 154862-43-8); 450 ppm of DOVERPHOS 9228 (a diphosphite: CAS Registry number 154862-43-8); 750 ppm of TINUVIN® 622 (HALS: CAS Registry number 65447-77-0); 750 ppm of CHIMASSORB® 944 (HALS: CAS Registry number 70624-18-9); and 750 ppm of zinc oxide.

The stabilizer package for PE-2 includes: 500 ppm of IRGANOX® 1076 (hindered phenol: octadecyl 3-(3,5 di-tert-butyl-4-hydroxylphenyl) propionate; 1000 ppm of IRGAFOS® 168 (phosphite: tris-(2,4 di-tert-butyl phenyl) phosphite); and 1000 ppm of CYASSORB® 3529 (HALS: CAS Registry number 193098-40-7).

A series of blends were made with these materials. The blend compositions are illustrated in Table 2. Rotomolded parts were prepared using the compositions and conditions shown in Table 2 in a rotational molding machine sold under the tradename ROTOSPEED® RS3-160 by Ferry Industries Inc. The machine has two arms which rotate about a central axis. Each arm is fitted with a plate which rotates on an axis that is roughly perpendicular to the axis of rotation of the arm. Each plate is fitted with three cast aluminum molds that produce plastic cubes having dimensions of 12.5 inches (31.8 cm)×12.5 inches×12.5 inches. These molds produce parts having a nominal thickness of about 0.25 inches (0.64 cm) when initially filled with a standard charge of about 3.7 kg of polyethylene resin.

A gas fired furnace which is capable of providing 2 million British thermal units (Btu) per hour is used to provide hot air that is circulated about the molds by a fan. In general, the temperature within the enclosed oven is maintained at a temperature of between 250° C. and 400° C. for specified periods of time while the machine rotates the arms (typically, at about 8 revolutions per minute (rpm) and the plate (typically, at about 2 rpm)). Specific molding conditions for the different compositions are reported in Table 2.

The "cooked parts" are then cooled by opening the oven. Water spray may also be used to facilitate cooling. "Cook times", rotation speed, temperatures, and cooling cycles are computer controlled with appropriate software which also includes a data acquisition system.

TABLE 2

Blend Compositions and Rotomolding Conditions

| Experiment Number | Composition | Cook Time (minutes) | Oven Temperature (° C.) |
|---|---|---|---|
| 1 | 90% PE-1 + 10% PCR-1-S1 | 22 | 293° C. (560° F.) |
| 2 | 80% PE-1 + 20% PCR-1-S1 | 22 | 293° C. (560° F.) |
| 3 | 70% PE-1 + 30% PCR-1-S1 | 22 | 293° C. (560° F.) |
| 4 | 90% PE-2 + 10% PCR-1-S1 | 22 | 293° C. (560° F.) |
| 5 | 80% PE-2 + 20% PCR-1-S1 | 22 | 293° C. (560° F.) |
| 6 | 70% PE-2 + 30% PCR-1-S1 | 22 | 293° C. (560° F.) |
| 7 | 90% PE-1 + 10% PCR-1-S2 | 22 | 293° C. (560° F.) |
| 8 | 80% PE-1 + 20% PCR-1-S2 | 22 | 293° C. (560° F.) |
| 9 | 70% PE-1 + 30% PCR-1-S2 | 22 | 293° C. (560° F.) |
| 10 | 90% PE-2 + 10% PCR-1-S2 | 22 | 293° C. (560° F.) |
| 11 | 80% PE-2 + 20% PCR-1-S2 | 22 | 293° C. (560° F.) |
| 12 | 70% PE-2 + 30% PCR-1-S2 | 22 | 293° C. (560° F.) |

Surface Roughness

The parts were cut to provide test specimens. Surface roughness data for the interior and exterior surfaces are shown in Table 3. While not wishing to be bound by theory, it is believed that the virgin resin (which has a small particle size and high flow rate in comparison to the substantially non-stabilized polyethylene) melts onto the heated mold surface preferentially, thereby forming the exterior surface of the molded part. The PCR resin, having larger particle size and poor flow rate, does not melt on the mold surface as well as the virgin resin, with the result that the PCR resin is present on the interior surface of the molded part. As a result, the large particles of the substantially non-stabilized polyethylene, together with the poor flow rate of this material, contribute to the high surface roughness of the interior surface of parts prepared according to the present process.

TABLE 3

Surface Roughness Results

Figure 4:
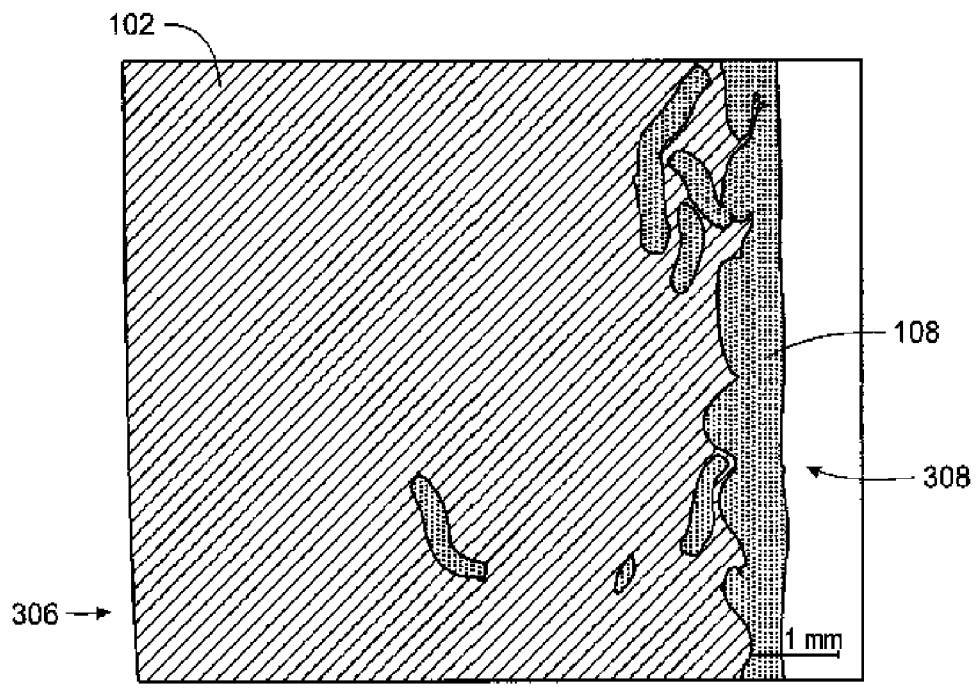
FIGS. 4-15 are cross-sectional views of sidewalls of rotomolded parts that include recycled resin.
Figure 5:
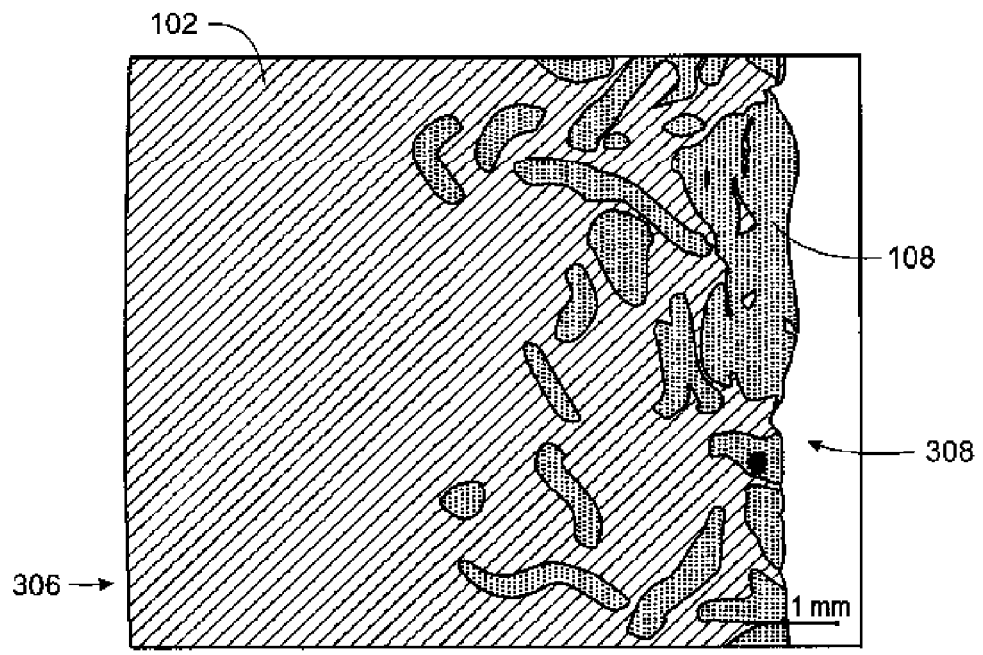
Figure 6:
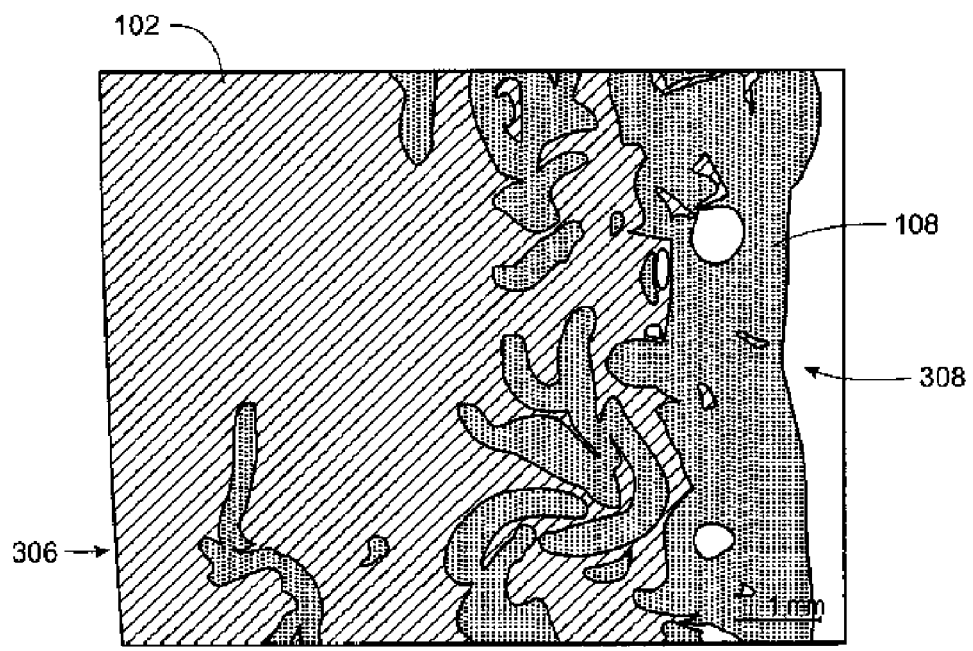
Figure 7:
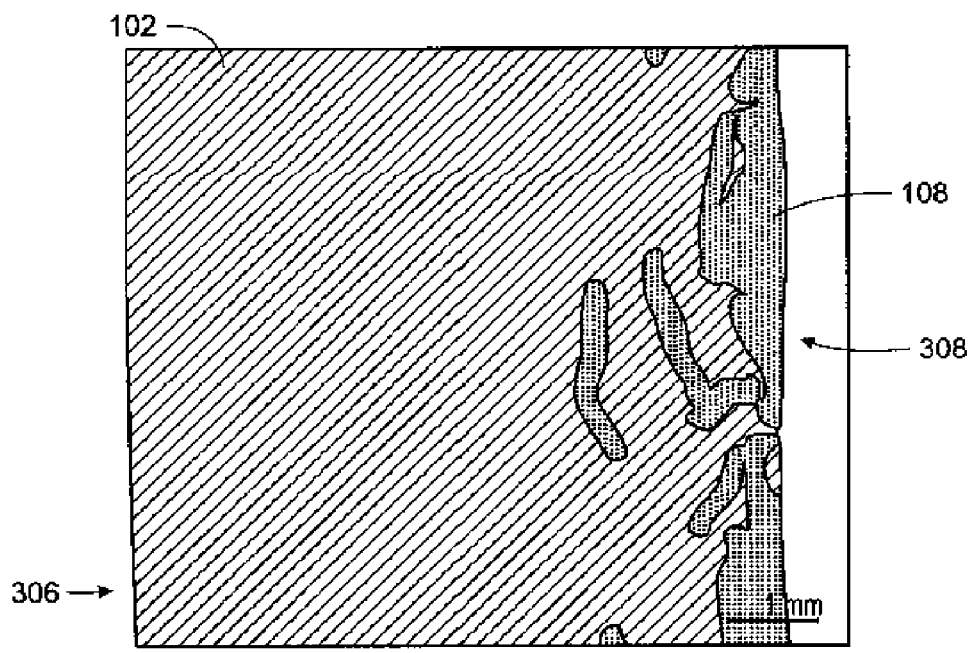
Figure 8:
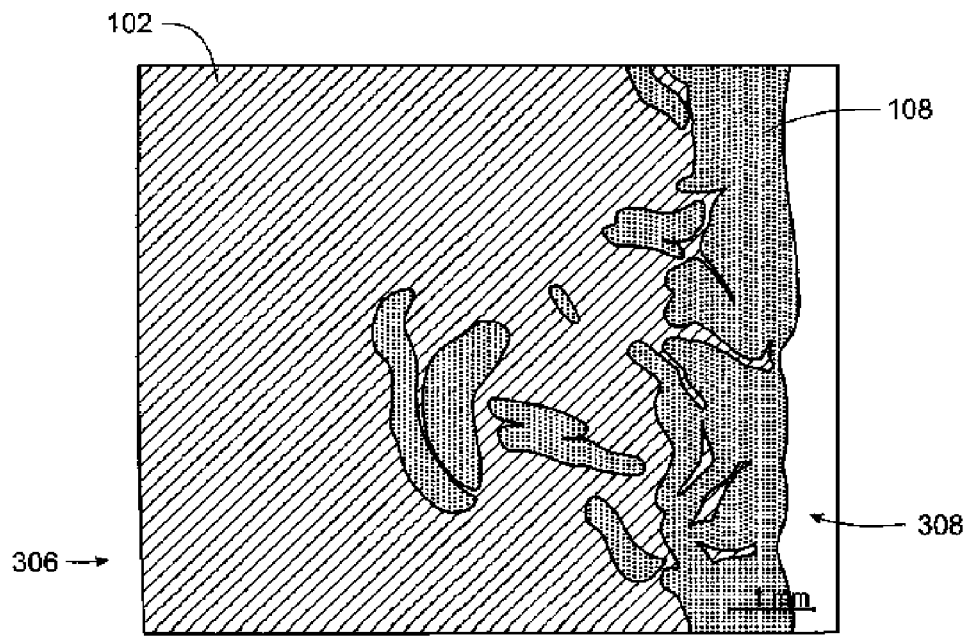
Figure 9:
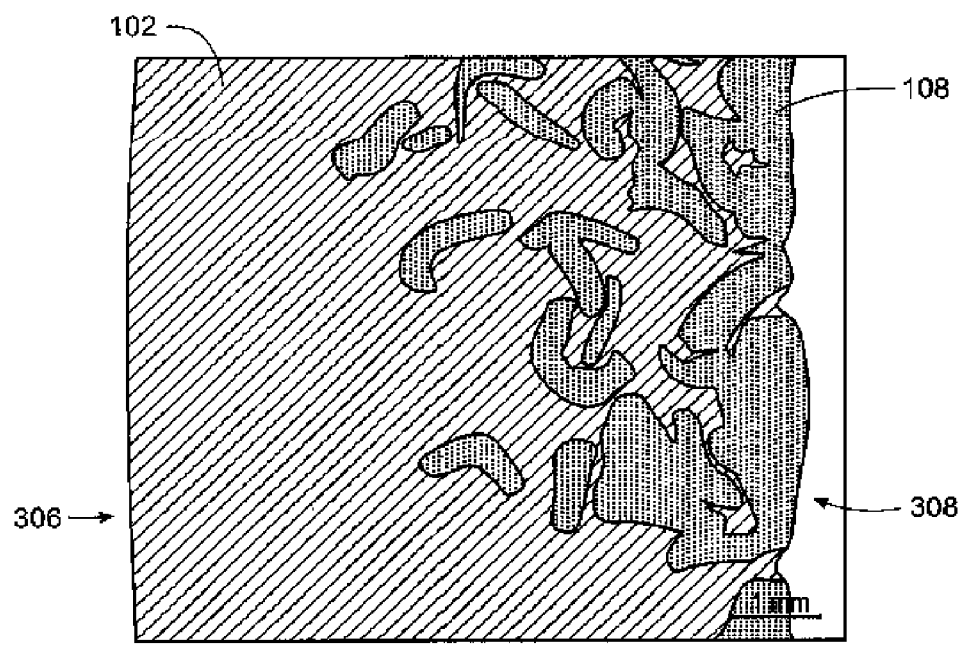
Figure 10:
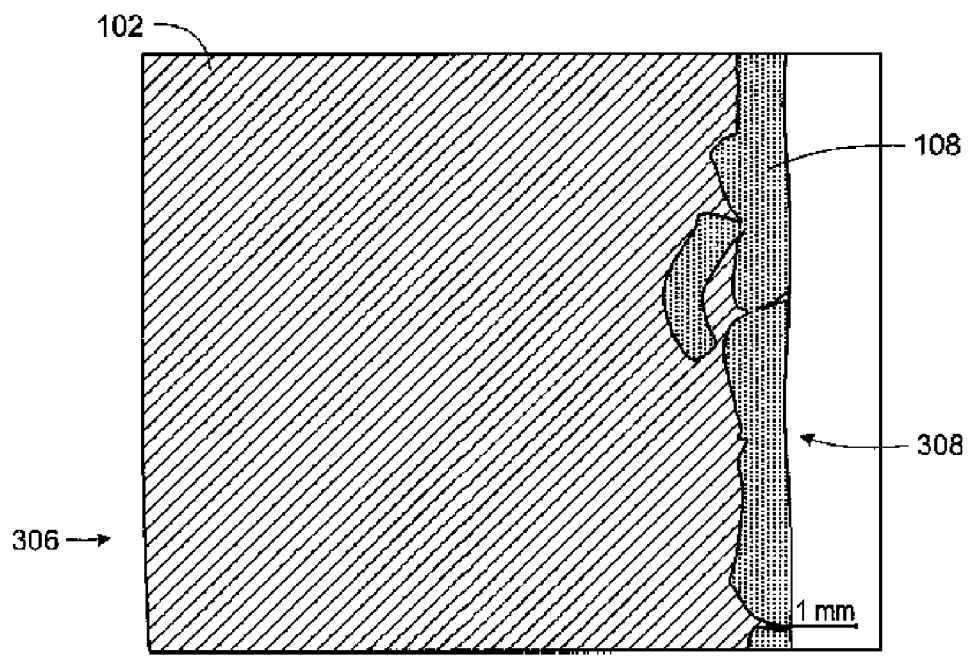

| Exp. No. | % PCR-1 (size in.) | Interior Surface Roughness (µm) | | | Average | Sidewall Intrusion |
|---|---|---|---|---|---|---|
| | | 1 | 2 | 3 | | |
| 1 | 10% (0.038) | 3.351 | 3.785 | 13.180 | 6.764 | 56% (FIG. 4) |
| 2 | 20% (0.038) | 3.944 | 8.546 | 12.480 | 8.323 | 57% (FIG. 5) |
| 3 | 30% (0.038) | 10.065 | 7.0095 | 5.714 | 7.596 | 82% (FIG. 6) |
| 4 | 10% (0.038) | 3.487 | 4.055 | 12.649 | 6.830 | 31% (FIG. 7) |
| 5 | 20% (0.038) | 2.471 | 13.462 | 1.726 | 5.886 | 64% (FIG. 8) |
| 6 | 30% (0.038) | 5.664 | 5.430 | 2.164 | 4.419 | 70% (FIG. 9) |
| 7 | 10% (0.054) | 4.604 | 4.001 | 5.808 | 4.804 | 20% (FIG. 10) |

TABLE 3-continued

Surface Roughness Results

Figure 11:
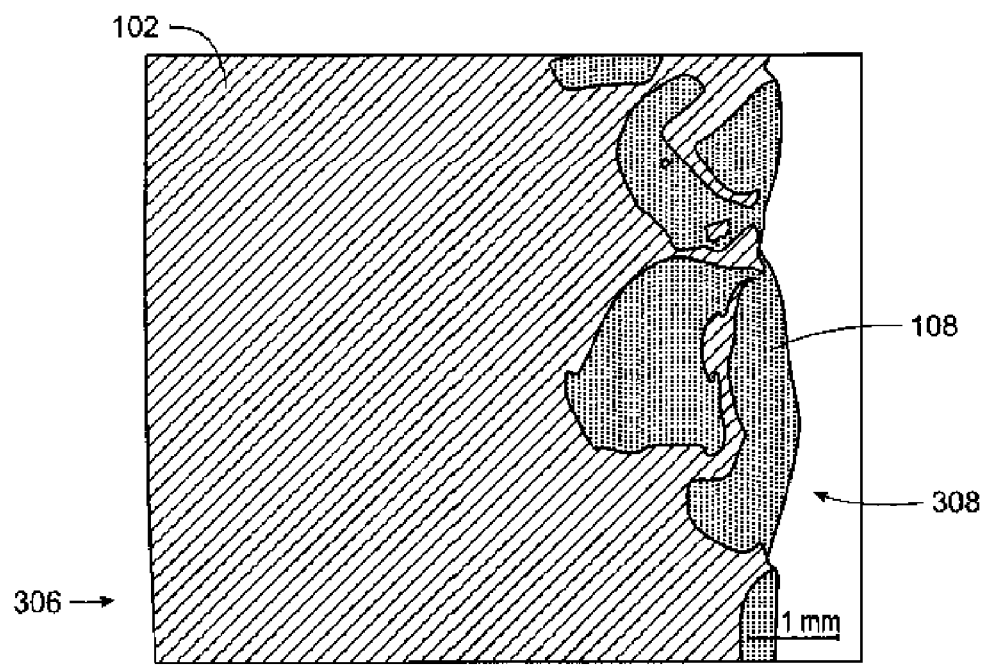
Figure 12:
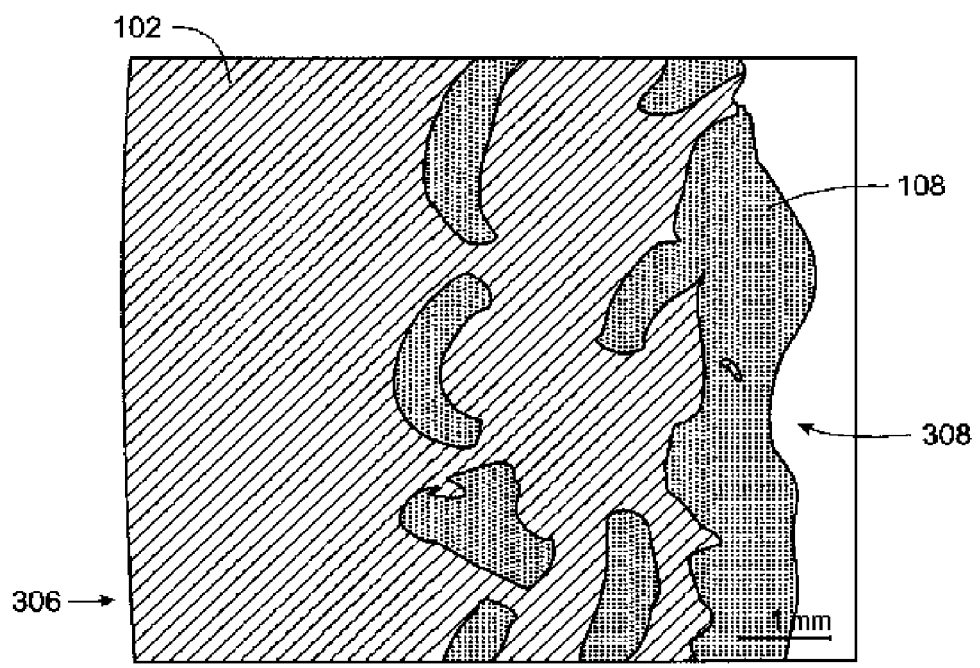
Figure 13:
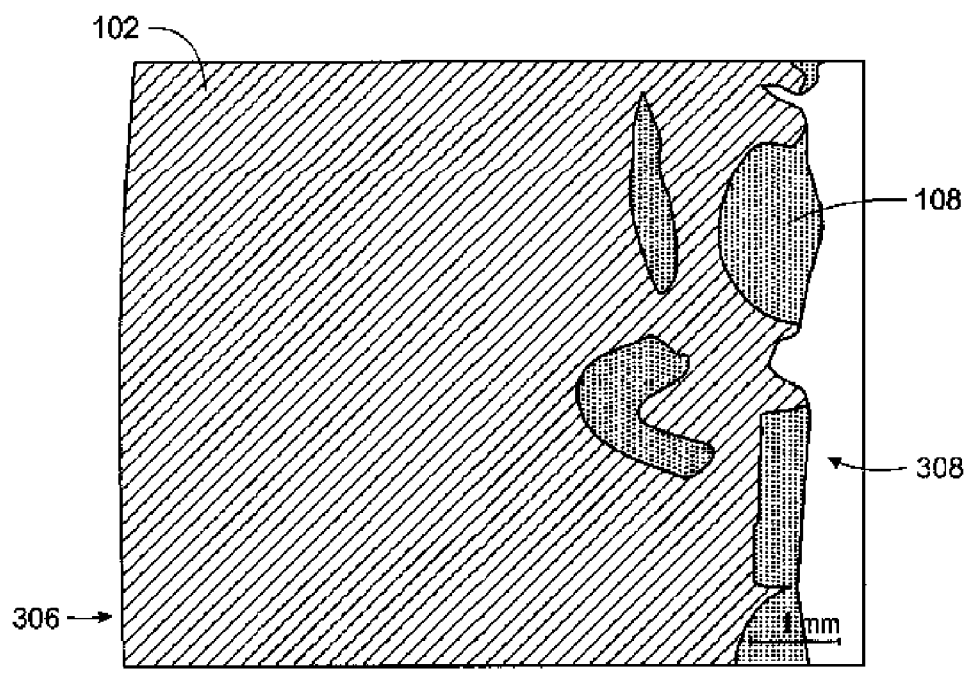
Figure 14:
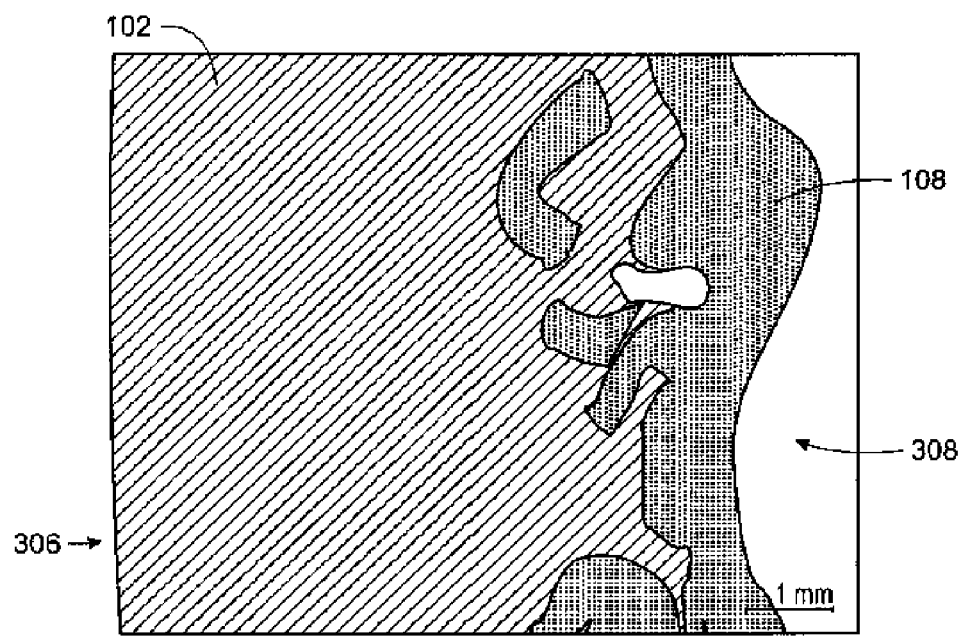
Figure 15:

| Exp. No. | % PCR-1 (size in.) | Interior Surface Roughness (μm) | | | | Sidewall Intrusion |
|---|---|---|---|---|---|---|
| | | 1 | 2 | 3 | Average | |
| 8 | 20% (0.054) | 13.457 | 1.907 | 2.811 | 6.058 | 37% (FIG. 11) |
| 9 | 30% (0.054) | 6.240 | 3.840 | 6.148 | 5.409 | 60% (FIG. 12) |
| 10 | 10% (0.054) | 9.077 | 8.350 | 5.713 | 7.713 | 32% (FIG. 13) |
| 11 | 20% (0.054) | 5.691 | 3.239 | 11.542 | 6.824 | 42% (FIG. 14) |
| 12 | 30% (0.054) | 6.228 | 4.907 | 3.557 | 4.897 | 57% (FIG. 15) |

Further, the larger particles of the PCR resin partially penetrate the sidewall formed from the virgin resin. The depth of penetration is calculated as shown with respect to FIG. 3.

Figure 3:
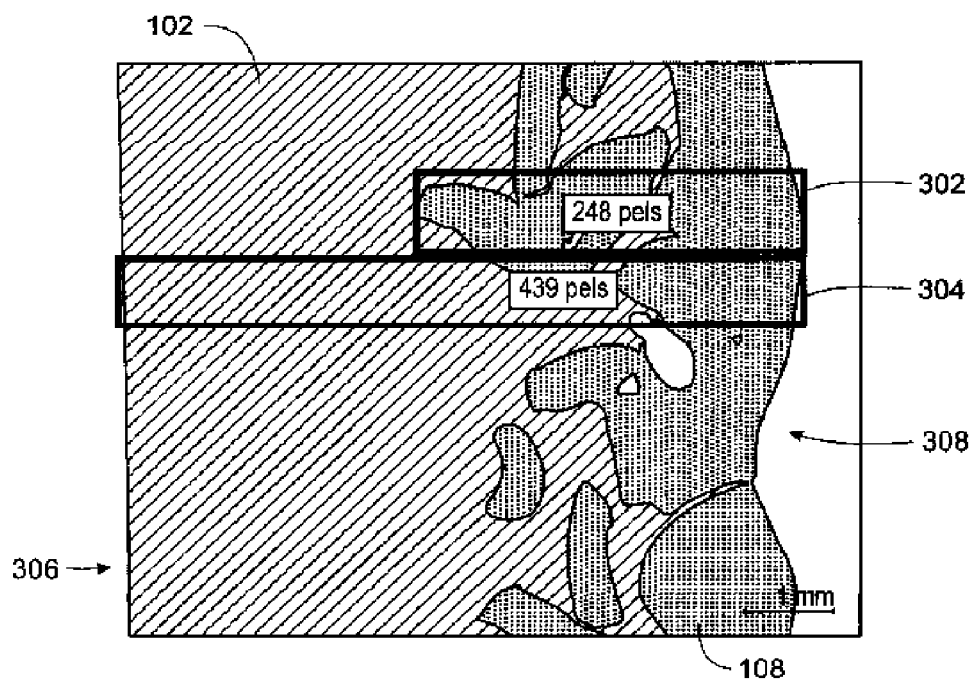
FIG. 3 is a schematic view of the determination of depth of penetration of recycled plastic from cross-sectional views of a sidewall of a rotationally molded part that includes recycled resin.

FIG. 3 is a schematic view of the determination of depth of penetration (sidewall intrusion) of recycled plastic from cross-sectional views of a sidewall of a rotationally molded part that includes recycled resin. Like numbered items are as identified with respect to FIG. 1. In the cross-sectional view, the lighter material is the virgin resin 102 while the darker material is the recycled resin 108. The intrusion depth is estimated by comparing the depth of the greatest penetration 302 of the recycled resin 302 in pixel units (pels), with the total sidewall width 304 in pels. In the example shown in FIG. 3, the intrusion depth is equal to 248 pels divided by 439 pels giving 57%. In this illustration, the exterior surface 306 of the part is made up of virgin resin 102, while the interior surface 308 is generally formed from the recycled resin 108.

FIGS. 4-15 are cross-sectional views of each of the sidewalls of rotomolded parts that include recycled plastic. Like numbered items are as identified with respect to FIGS. 1 and 3. The relevant figure for each experiment is identified in Table 3.

Figure 16:
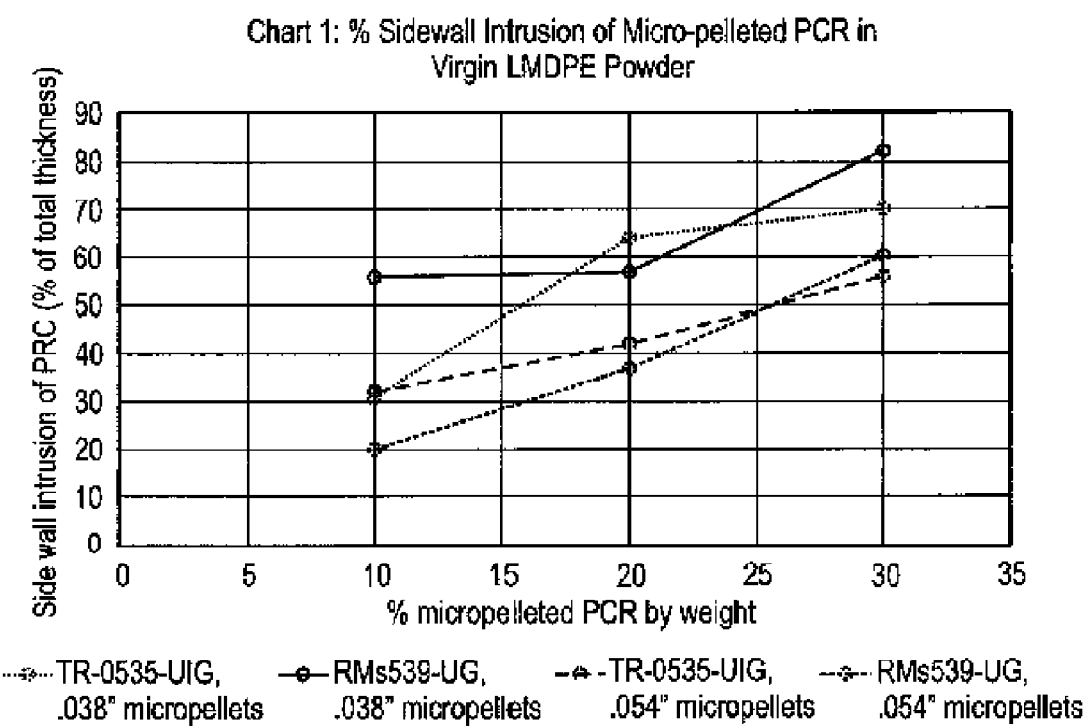
FIG. 16 is a plot showing the depth of penetration of recycled resin in the sidewall of a rotationally molded part versus the weight percent of the recycled plastic in the rotationally molded part.

FIG. 16 is a plot showing the depth of penetration or sidewall intrusion of the PCR resin in the sidewall of a rotationally molded part versus the weight percent of the recycled plastic in the rotationally molded part. The depth of penetration of the PCR resin may affect the physical properties of the final part. The physical properties are listed in Table 4.

As seen in Table 4, the impact properties of the structures are low. No difference in impact performance is seen between hexene copolymerized gas phase Zieglar-Natta catalyzed resin and single-site octene copolymer in term of particle distribution or physical properties. The physical properties, e.g., impact from the outside of the structure, fall to the inherent properties of the PCR resin when the PCR resin forms the inside surface. In this case, the PCR resin showed very low ductility and impact strength even at room temperature. Drop impact performance, which stresses the part from the inside to the outside, would more likely result in good physical properties, as the properties of the virgin resin would dominate.

In some embodiments, the inner PCR resin layer may be encapsulated, for example, by the formation of an interior layer of virgin resin, e.g., an ABA structure. For example, this could be performed using a dropbox to add new material to the interior cavity after the formation of the AB structure. The formation of an additional layer on the inside of the part could be used to increase the impact strength of the structure. The additional layer is not limited to a virgin resin but may be a different recycled resin having a higher impact strength than the recycled resin of the B layer, for example, forming an ABC structure.

TABLE 4

Physical Properties of PCR Resin and Virgin Resin Rotomolded Parts

| Exp. No. | Impact-ARM[1], 23° C. (ft-lb) | Impact-ARM, 23° C. (% Ductile) | Impact-ARM, 40° C. (ft-lb) | Impact-ARM, 40° C. (% Ductile) |
|---|---|---|---|---|
| 1 | 0[2] | 0 | 0 | 0 |
| 2 | 0 | 0 | 0 | 0 |
| 3 | 0 | 0 | 0 | 0 |
| 4 | 0 | 0 | 0 | 0 |
| 5 | 0 | 0 | 0 | 0 |
| 6 | 0 | 0 | 0 | 0 |
| 7 | 0 | 0 | 0 | 0 |
| 8 | 0 | 0 | 0 | 0 |
| 9 | 0 | 0 | 0 | 0 |
| 10 | 23.8 | 0 | 0 | 0 |
| 11 | 0 | 0 | 0 | 0 |
| 12 | 0 | 0 | 0 | 0 |

[1]The ARM impact test is a falling-dart impact test. Impact energy is calculated as the dart weight (in lbs.) multiplied by the height from which the dart is dropped. For example, a 20-lb dart dropped from a height of 3 feet would impart an impact energy of 60 ft-lb. Dart height is varied to determine the energy threshold at which samples fail 50% of the time. Failure mode is observed and reported. If damage is limited to the immediate impact area the failure is said to be ductile. If cracks propagate a significant distance from the impact site (i.e. the sample shatters) failure mode is said to be brittle. Ten samples are run, and the % ductile is calculated as the percentage showing ductile failures.
[2]The minimum break value measured is 20 ft-lbs. Accordingly, a value of zero in the table indicates a breakage of less than about 20 ft-lbs.

The best separation between the two layers, e.g., maximum 50% penetration in a ¼ thick part, occurs when the virgin resin is 35 mesh size, and the PCR resin is in the form of 0.54" dia. micropellets. However, both sizes of micropellets resulted in no pellet penetrations to the surface of the ¼ thick part, resulting in virgin-like aesthetics.

Embodiments contemplated herein include the following.

In an embodiment described in examples herein, a rotomolding composition is provided. The rotomolding composition includes a virgin resin, including a polyethylene polymer and a postconsumer recycle (PCR) resin.

In an aspect, the polyethylene polymer includes a homopolymer. In an aspect, the polyethylene polymer includes a copolymer.

In an aspect, the virgin resin has a melt index, $I_2$, as measured by ASTM D 1238 at 190° C. using a 2.16 kg weight, of from 0.5 to 10 grams/10 minutes and a density as measured by ASTM D792 of from 0.920 to 0.950 g/cc. In an aspect, the virgin resin has a particle size of between about 0.2 mm and about 0.3 mm. In an aspect, the virgin resin has a particle size of about 0.25 mm.

In an aspect, the rotomolding composition of claim 1 includes between about 90 weight % and about 50 weight % of the virgin resin and between about 10 weight % and about 50 weight % of the PCR resin. In an aspect, the rotomolding composition includes between about 90 weight % and about 70 weight % of the virgin resin and between about 10 weight % and about 30 weight % of the PCR resin. In an aspect, the rotomolding composition of claim 1, including about 80 weight % of the virgin resin and about 20 weight % of the PCR resin.

In an aspect, the PCR resin is chosen from recycled polyethylene or recycled polyolefins. In an aspect, a particle size of the PCR resin is between about 1 mm and about 4 mm. In an aspect, a particle size of the PCR resin is between about 1.5 mm and about 2.5 mm. In an aspect, a particle size of the virgin resin is less than the particle size of the PCR resin.

In an aspect, the virgin resin includes a stabilizer package that includes a primary antioxidant in an amount of from about 250 parts per million by weight (ppm) to about 1500 ppm and a secondary antioxidant in an amount of from about 250 ppm to about 1500 ppm.

Another embodiment described in examples herein provides a method to prepare a rotomolded part. The method includes preparing a rotomolding composition. The rotomolding composition includes a virgin resin, including a polyethylene polymer and a postconsumer recycle (PCR) resin. The rotomolding composition is added to a mold and the mold is rotated to evenly distribute the rotomolding composition on an interior surface of the mold while heating the mold to form the rotomolded part. The mold is rotated while being cooled to solidify the rotomolded part. The rotomolded part is removed from the mold.

In an aspect, the method includes separately adding the virgin resin and the PCR resin to the mold. In an aspect, the method includes forming a dry blend of the virgin resin and the PCR resin and adding the dry blend to the mold. In an aspect, the method includes heating the mold to a temperature of from about 250° C. to about 400° C.

In an aspect, the method includes producing the rotomolded part having an interior surface with a surface roughness of about 4 μm to about 8 μm. In an aspect, the method includes producing the rotomolded part having an interior surface with a surface roughness of about 6.3 μm.

Another embodiment described in examples herein provides a rotomolded part. The rotomolded part has an exterior layer formed from virgin resin and an interior layer formed from postconsumer recycle (PCR) resin.

In an aspect, the virgin resin includes polyethylene. In an aspect, the polyethylene includes a homopolymer. In an aspect, the polyethylene includes a copolymer. In an aspect, the polyethylene has a melt index, $I_2$, as measured by ASTM D 1238 at 190° C. using a 2.16 kg weight, of from 0.5 to 10 grams/10 minutes and a density as measured by ASTM D792 of from 0.920 to 0.950 g/cc.

In an aspect, the rotomolded part includes between about 90 weight % and about 70 weight % of the virgin resin and between about 10 weight % and about 30 weight % of the PCR resin.

Other embodiments within the scope of the claims below are contemplated.

INDUSTRIAL APPLICABILITY

The present disclosure relates to a method and compositions for forming rotomolded parts. The method allows forming rotomolded parts with an interior surface comprising mainly recycled polymeric material and an exterior surface comprising mainly virgin polyethylene.

The invention claimed is:

1. A rotomolding composition comprising:
 a virgin polyethylene copolymer having an average particle size from about 0.2 mm to 0.4 mm; a melt index, $I_2$, of from 0.5 grams/10 minutes to 10 grams/10 minutes as measured by ASTM D1238; and a density as measured by ASTM D792 of from 0.920 g/cc to 0.950 g/cc; and
 a recycled polyethylene resin having an average particle size from 1 mm and 4 mm;
 wherein the recycled polyethylene resin has a recycled polyethylene melt index, $I_2$, that is less than the melt index of the virgin polyethylene copolymer.

2. The rotomolding composition of claim 1, wherein the average particle size of the virgin polyethylene copolymer is between about 0.2 mm and about 0.3 mm.

3. The rotomolding composition of claim 1, wherein the average particle size of the virgin polyethylene copolymer is about 0.25 mm.

4. The rotomolding composition of claim 1, comprising:
 between about 90 weight % and about 50 weight % of the virgin polyethylene copolymer; and
 between about 10 weight % and about 50 weight % of the recycled polyethylene resin.

5. The rotomolding composition of claim 1, comprising:
 between about 90 weight % and about 70 weight % of the virgin polyethylene copolymer; and
 between about 10 weight % and about 30 weight % of the recycled polyethylene resin.

6. The rotomolding composition of claim 1, comprising about 80 weight % of the virgin polyethylene copolymer; and about 20 weight % of the recycled polyethylene resin.

7. The rotomolding composition of claim 1, wherein the average particle size of the recycled polyethylene resin is between about 1.5 mm and about 2.5 mm.

8. The rotomolding composition of claim 1, wherein the virgin polyethylene copolymer comprises a stabilizer package comprising:
 a primary antioxidant in an amount of from about 250 parts per million by weight (ppm) to about 1500 ppm; and
 a secondary antioxidant in an amount of from about 250 ppm to about 1500 ppm.

9. A process to prepare a rotomolded part, the process comprising:
 preparing a rotomolding composition comprising:
  a virgin polyethylene copolymer having an average particle size from about 0.2 mm to 0.4 mm; a melt index, $I_2$, of from 0.5 grams/10 minutes to 10 grams/10 minutes as measured by ASTM D1238; and a density as measured by ASTM D792 of from 0.920 g/cc to 0.950 g/cc; and
  a recycled polyethylene resin having an average particle size from 1 mm and 4 mm;
  wherein the recycled polyethylene resin has a recycled polyethylene melt index, $I_2$, that is less than the melt index of the virgin polyethylene copolymer; and
 adding the rotomolding composition to a mold;
 rotating the mold to evenly distribute the rotomolding composition on an interior surface of the mold while heating the mold to form the rotomolded part;
 rotating the mold while cooling the mold to solidify the rotomolded part; and
 removing the rotomolded part from the mold.

10. The process of claim 9, comprising:
forming a dry blend of the virgin polyethylene copolymer and the recycled polyethylene resin; and
adding the dry blend to the mold.

11. The process of claim 9, comprising heating the mold to a temperature of from about 250° C. to about 400° C.

12. The process of claim 9, comprising producing the rotomolded part having an interior surface with a surface roughness of about 4 μm to about 8 μm.

13. The process of claim 9, comprising producing the rotomolded part having an interior surface with a surface roughness of about 6.3 μm.

\* \* \* \* \*